United States Patent
Thibaut

(10) Patent No.: US 11,255,484 B2
(45) Date of Patent: Feb. 22, 2022

(54) DEVICE AND METHOD FOR FILLING A TANK OR TANKS WITH PRESSURIZED GAS

(71) Applicant: L'Air Liquide, Societe Anonyme pour l'Etude et l'Exploitation des Procedes Georges Claude, Paris (FR)

(72) Inventor: Francois Thibaut, Fontanil Cornillon (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/734,552

(22) PCT Filed: May 13, 2019

(86) PCT No.: PCT/FR2019/051066
§ 371 (c)(1),
(2) Date: Dec. 2, 2020

(87) PCT Pub. No.: WO2019/234321
PCT Pub. Date: Dec. 12, 2019

(65) Prior Publication Data
US 2021/0231263 A1 Jul. 29, 2021

(30) Foreign Application Priority Data
Jun. 7, 2018 (FR) .................................... 1854953

(51) Int. Cl.
*F17C 5/00* (2006.01)
*F17C 5/06* (2006.01)
*F17C 13/02* (2006.01)

(52) U.S. Cl.
CPC ................ *F17C 5/007* (2013.01); *F17C 5/06* (2013.01); *F17C 13/025* (2013.01);
(Continued)

(58) Field of Classification Search
CPC .......... F17C 5/007; F17C 5/06; F17C 13/025; F17C 2205/0142; F17C 2205/0326;
(Continued)

(56) References Cited

U.S. PATENT DOCUMENTS 5,150,578 A * 9/1992 Oota ..................... F17C 13/025
505/892
5,351,726 A * 10/1994 Diggins .................... F17C 5/06
123/525
(Continued)

FOREIGN PATENT DOCUMENTS

DE 10 2009 037886 2/2011
EP 2 728 243 5/2014
(Continued)

OTHER PUBLICATIONS

International Search Report and Written Report for PCT/FR2019/051066, dated Sep. 26, 2019.
(Continued)

*Primary Examiner* — Timothy L Maust
*Assistant Examiner* — James R Hakomaki
(74) *Attorney, Agent, or Firm* — Christopher J. Cronin

(57) ABSTRACT

A device for filling a tank or tanks with pressurized gas comprising a circuit comprising a plurality of upstream ends connected respectively to separate pressurized gas sources, at least one compressor, at least one buffer storage, a set of controlled valves and at least one downstream end intended to be connected to the tank(s) to be filled, the device further comprising an electronic control member configured to control the valves and/or the compressor in order to ensure a transfer of gas into the tank from at least one source and/or at least one buffer storage and/or via the compressor, the device comprising a set of sensors for measuring the pressure in the sources and the buffer storages, the control
(Continued)

member comprising member for receiving or generating signal representative of the filling demand from a relatively high demand to a relatively low demand, the control member being configured to ensure the transfer of gas into the tank according to at least a first transfer mode using the source having the highest pressure and a second transfer mode using a source having a pressure lower than this highest pressure in response, respectively, to a relatively high or low filling demand.

17 Claims, 2 Drawing Sheets

(52) U.S. Cl.
CPC ............... *F17C 2205/0142* (2013.01); *F17C 2205/0326* (2013.01); *F17C 2221/012* (2013.01); *F17C 2223/0123* (2013.01); *F17C 2223/036* (2013.01); *F17C 2227/0157* (2013.01); *F17C 2227/0341* (2013.01); *F17C 2227/043* (2013.01); *F17C 2250/032* (2013.01); *F17C 2250/034* (2013.01); *F17C 2250/038* (2013.01); *F17C 2250/043* (2013.01); *F17C 2250/0439* (2013.01); *F17C 2250/0473* (2013.01); *F17C 2250/0689* (2013.01); *F17C 2265/065* (2013.01); *F17C 2270/0168* (2013.01)

(58) Field of Classification Search
CPC ........ F17C 2221/012; F17C 2223/0123; F17C 2223/036; F17C 2227/0157; F17C 2227/0341; F17C 2227/043; F17C 2250/032; F17C 2250/034; F17C 2250/038; F17C 2250/043; F17C 2250/0439; F17C 2250/0473; F17C 2250/0689; F17C 2265/065; F17C 2270/0168; Y02E 60/32

USPC ............................................................ 141/1
See application file for complete search history.

(56) References Cited

U.S. PATENT DOCUMENTS

| | | | | |
|---|---|---|---|---|
| 5,385,176 | A * | 1/1995 | Price | F17C 5/06 141/1 |
| 5,826,632 | A * | 10/1998 | Micke | F17C 5/06 141/9 |
| 5,832,906 | A * | 11/1998 | Douville | F02D 19/027 123/527 |
| 5,947,854 | A * | 9/1999 | Kopko | F16H 3/72 475/2 |
| 6,432,283 | B1 * | 8/2002 | Fairlie | F17C 5/06 204/230.2 |
| 6,792,981 | B1 * | 9/2004 | Manning | F17C 5/06 141/3 |
| 7,410,348 | B2 * | 8/2008 | Chalk | F04B 15/08 417/555.1 |
| 2004/0182470 | A1 * | 9/2004 | White | F17C 5/00 141/11 |
| 2009/0205745 | A1 * | 8/2009 | Farese | F17C 5/007 141/12 |
| 2010/0193070 | A1 | 8/2010 | Allidieres | |
| 2015/0090364 | A1 | 4/2015 | Elgowainy et al. | |
| 2015/0167895 | A1 * | 6/2015 | Nagura | F17C 13/025 141/4 |

FOREIGN PATENT DOCUMENTS

| | | |
|---|---|---|
| EP | 3 270 033 | 1/2018 |
| FR | 3 042 254 | 4/2017 |

OTHER PUBLICATIONS

French Search Report and Written Opinion for FR 1 854 953, dated Feb. 4, 2019.

* cited by examiner

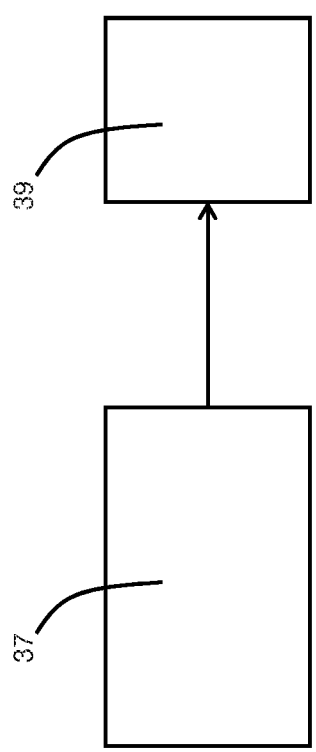

DEVICE AND METHOD FOR FILLING A TANK OR TANKS WITH PRESSURIZED GAS

CROSS-REFERENCE TO RELATED APPLICATIONS

This application is a § 371 of International PCT Application PCT/FR2019/051066, filed May 13, 2019, which claims § 119(a) foreign priority to French patent application FR 1 854 953, filed Jun. 7, 2018.

BACKGROUND

Field of the Invention

The invention relates to a device and to a method for filling a tank or tanks with pressurized gas.

The invention relates more particularly to a device for filling a tank or tanks with pressurized gas, notably with hydrogen, comprising a circuit comprising a plurality of upstream ends which are respectively connected to distinct sources of pressurized gas, the circuit further comprising at least one compressor, at least one buffer storage device, a set of operated valves and at least one downstream end intended to be connected to the tank or tanks to be filled, the device further comprising an electronic storage and processing control member connected to the set of valves and to the compressor(s), the control member being configured to command the valves and/or the compressor in order to ensure the transfer of gas into the tank from at least one source and/or from at least one buffer storage device by equalizing pressures and/or using the compressor, the device comprising a set of sensors for measuring the pressure within the sources and the buffer storage devices.

Related Art

The hydrogen-gas tank filling stations generally comprise (see FIG. 1)
- sources 4, 5, 6 of gas, of which notably the volumes are fixed and the pressures are able to vary according to their use,
- one or more compressors 7 (notably positive-displacement compressors which have a performance connected to the intake pressure or source pressure. When the source pressure increases: either the flow rate is higher, or the electrical power consumption is lower. This depends on the use being made of the compressor within its process),
- one or more buffer storage devices 8, 9, 10 (for example a high-pressure, a medium-pressure and a low-pressure buffer),
- an electronic control and distribution member/module 35 for filling a tank or a vehicle or a capacity from a source and/or from a buffer storage device and/or using the compressor.

Document US20150090364A1 describes a station controlling the choice of gas source according to pressure conditions.

See also document US20100193070A which describes various modes of filling.

The use of these stations may present certain problems when the activity is variable.

For example, in the case of vehicle tanks, the demand is rarely constant during the course of the day. Thus, there are peaks in demand for filling tanks. The station may be rated to absorb these peaks by using a compressor with a higher output and/or more voluminous storage devices. However, the station thus finds itself over-rated for the rest of the day and is therefore more expensive to purchase and to operate.

In addition, the performance of the station is dependent on the compressor 7. The performance of the compressor 7 is dependent on the source pressure with which it is fed. In order to have the certainty that the station 1 is adequately rated, the compressor 7 needs to be able to supply the highest output flow rate (at peak demand) at the lowest pressure available (minimum pressure). Thus, the station 1 and notably the compressor 7 are generally over-rated for the rest of the time when the source of gas is at a pressure higher than the minimum pressure. The reasoning is the same in respect of the buffer storage devices (low pressure for example between 100 and 300 bar, medium pressure for example between 400 and 550 bar, and high pressure for example between 850 and 1200 bar).

Thus, it is desirable to reduce the cost of purchasing the station by limiting the rating of the constituent elements (compressors and/or buffer storage device).

Likewise, one ever-present objective is to limit the electrical power consumption of the station.

Finally, it is advantageous to limit compressor wear.

SUMMARY OF THE INVENTION

One object of the present invention is to alleviate all or some of the above-mentioned drawbacks of the prior art.

To this end, the device according to the invention, in other respects in accordance with the generic definition thereof given in the above preamble, is essentially characterized in that the control member comprising a member for receiving or generating a signal representative of the demand for filling from among at least two distinct filling-demand levels: a relatively high demand and a relatively low demand, the control member being configured to ensure that gas is transferred into the tank using at least a first mode of transfer employing the source at the highest pressure and a second mode of transfer employing a source at a pressure lower than this highest pressure, the control member being further configured to fill the at least one tank according to the first mode of transfer in response to the receipt or generation of a signal indicating a relatively high demand for filling and to fill the at least one tank according to the second mode of transfer in response to the receipt or generation of a signal indicating a relatively low demand for filling.

Moreover, embodiments of the invention may comprise one or more of the following features:
- the member receiving or generating a signal indicative of the demand for filling comprises an electronic agenda and an electronic clock, the control member storing a predefined calendar defining periods of relatively high or relatively low demand according to the day and time which are defined by the agenda and the clock,
- the predefined calendar is updated and, where appropriate, modified, according to actual filling-demand data regarding quantity and dates and times, which is to say that the calendar is, where appropriate, modified iteratively and predictively as a function of logged past data,
- the predefined calendar is updated as a function of external data including: meteorological data (sunny/rainy), atmospheric temperature,
- the member receiving or generating a signal indicative of the demand for filling comprises a detector detecting a vehicle in a zone of the device or in an approach zone of the device, the control member being configured to define a relatively high or relatively low demand according to whether the number of vehicles detected in the zone of the device and/or approaching the device is above or below a predefined threshold number, the member receiving or generating a signal indicative of the demand for filling comprises a wireless or wired receiver configured to receive a signal to switch the mode of transfer of gas to the first mode of transfer or to the second mode of transfer, in the first mode of transfer, the transfer of gas employs one or more sources of gas at the highest pressure comprised between 400 and 800 bar, whilst in the second mode of transfer employs one or more sources of gas at a pressure lower than this highest pressure and comprised between 50 and 400 bar, the compressor is of the electric type, in the second mode of transfer, the electrical power of the compressor being comprised between 80% and 25% and preferably between 30 and 60% of the electrical power of the compressor in the first mode, the compressor is of the type involving the rotational or translational movement of a compression element at a determined speed during the second mode of transfer, the speed of the compression element of the compressor being comprised between 80% and 25% and preferably between 30 and 60% of the speed of the compression element in the first mode of transfer, in the second mode of transfer, the successive fillings of several tanks require a number of stops and restarts of the compressor which is lower in comparison with the number of stops and restarts needed to fill the same number of tanks in the first mode of transfer, each source comprises at least one of: a tank of pressurized gas, all or part of a set of tanks of pressurized gas on trailers, a tank of liquefied gas combined with a vaporizer, a pressurized-gas network.

The invention also relates to a method for filling a tank or tanks with pressurized gas, notably with hydrogen, using a filling device conforming to any one of the abovementioned features, the method comprising a step of filling at least one tank according to the first mode of transfer in response to the receipt or generation of a signal indicating a relatively high demand for filling, or a step of filling at least one tank according to the second mode of transfer in response to the receipt or generation of a signal indicating a relatively low demand for filling, the transfer of gas into the tank using the first mode of transfer employing the source at the highest pressure, the transfer of gas into the tank using the second mode of transfer employing a source of gas at a pressure lower than this highest pressure.

According to other possible distinguishing features:

the method comprises a step of generating or receiving a signal indicative of a relatively high demand for filling in anticipation of said relatively high demand for filling, the method comprises, during or after or before the filling of a tank, a step of filling at least part of the buffer storage devices with gas from at least one source and possibly using the compressor, the filling of at least part of the buffer storage devices is performed using the source of gas at the highest pressure during a period of relatively high demand for filling, the filling of at least part of the buffer storage devices is performed from a source at a pressure lower than this highest pressure during a period of relatively low demand for filling.

The invention may also relate to any alternative device or method comprising any combination of the features above or below within the scope of the claims.

Other specific features and advantages will become apparent from reading the following description, given with reference to the single FIGURE which schematically and partially depicts one example of the structure and operation of the invention.

BRIEF DESCRIPTION OF THE FIGURES

FIG. 2 is a schematic of a liquid tank associated with a vaporizer.

DETAILED DESCRIPTION OF THE INVENTION

Figure 1:
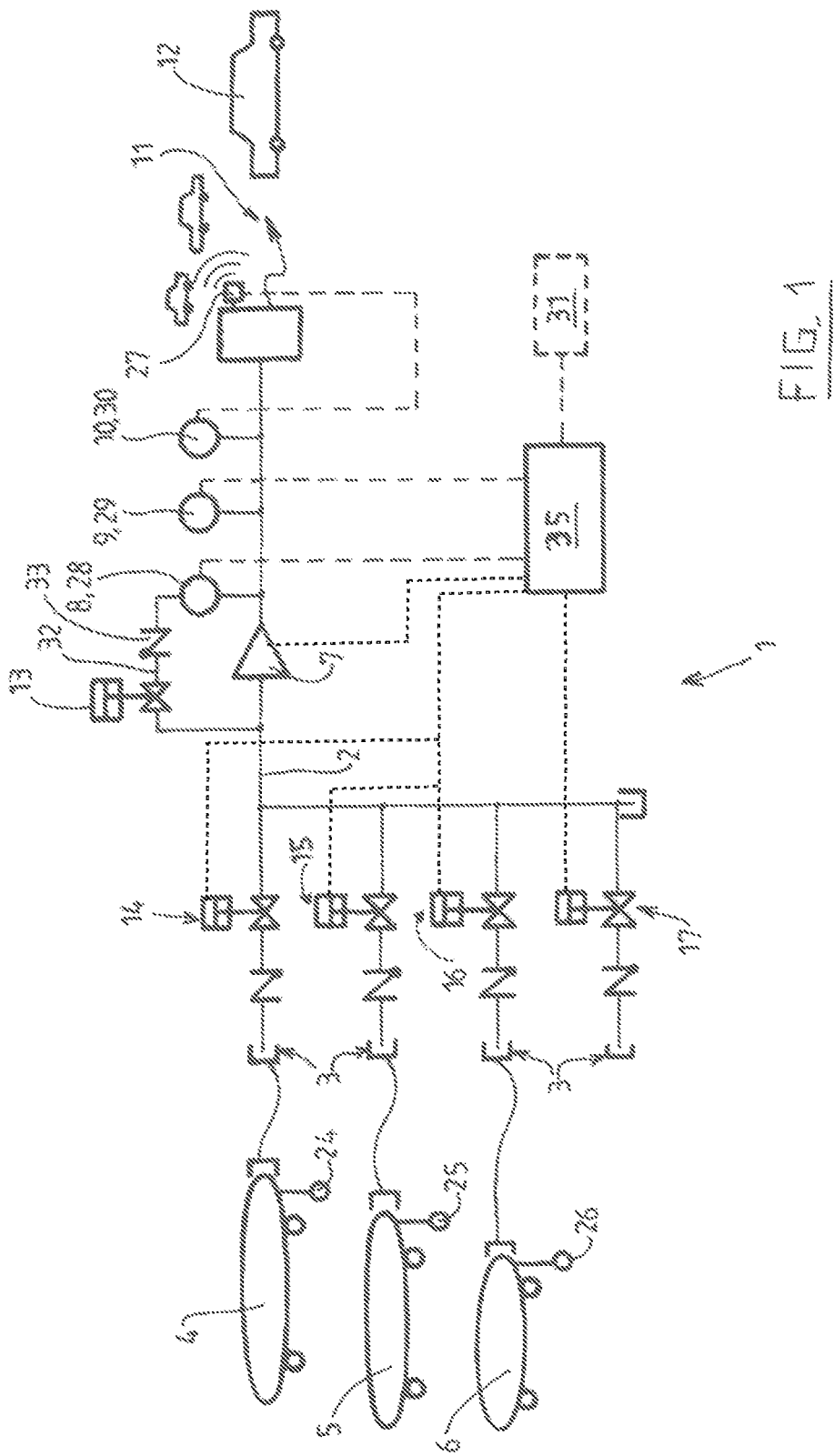
FIG. 1 is a schematic of an embodiment of the inventive device.

The device for filling a tank or tanks with pressurized gas, notably hydrogen, comprises a circuit 2 comprising a plurality of upstream ends 3 respectively connected to distinct sources 4, 5, 6 of pressurized gas (generally at distinct pressures).

The sources 4, 5, 6 may comprise at least one of the following: tanks of pressurized gas or collections (bundles) of tanks of pressurized gas; these tanks or collections of tanks may be arranged on mobile trailers ("tube trailers"), liquid tanks 37 associated with a vaporizer 39, a pressurized-gas network or any other appropriate source.

The circuit 2 further comprises at least one compressor 7, preferably of positive-displacement type.

The circuit 2 preferably further comprises at least one buffer storage device 8, 9, 10, for example 3 buffer storage devices (devices for storing pressurized gas). These buffer storage devices 8, 9, 10 may be filled by the source or sources, directly (equalizing) and/or via the compressor 7. Likewise, one buffer storage device may fill another storage device (for example directly and/or via the compressor 7).

As illustrated, the device 1 may comprise a recirculation pipe 32 connecting the outlet of the compressor 7 to its inlet and fitted with a valve 13. A one-way check valve may also be provided. This recirculation pipe 32 makes it possible, where appropriate, to control the output flow rate of the compressor 7 by controlling the quantity of gas from its outlet that is returned to its intake (inlet). In addition, a buffer storage device 8 may be provided on this line so that it can be filled by the compressor 7 and also so that it can, where appropriate, constitute a source of gas for the compressor 7 (for example for filling the other buffer storage devices 9, 10).

In the conventional way, the buffer storage devices 8, 9, 10 can be used to fill a tank or tanks 12 in "cascade" (successive pressure equalizing operations). These storage devices 8, 9, 10 may supply the compressor 12 or supplement the compressor 12. What that means to say is that the buffer storage devices may transfer gas into the tank 12 at the same time as the compressor 7 and/or before and/or after the compressor 12.

Also in the known way, buffer storage devices 8, 9, 10 may be filled by the source or sources 4, 5, 6 (and possibly via the compressor 7) while other buffer storage devices are being used to fill the tank 12.

Also in the conventional way, the filling of a tank 12 may be controlled at a predefined rate of filling and/or as a function of any appropriate parameter: pressure, temperature, density, amount of gas, etc.

The circuit 2 comprises a set of valves 13, 14, 15, 16, preferably operated valves and at least one downstream end 11 (nozzle, coupling or dispenser, etc.) intended to be connected to the tank or tanks 12 to be filled. The downstream end 11 is preferably situated at the end of a flexible hose.

The filling device 1 further comprising an electronic storage and processing control member 35. This control member 35 comprises for example a microprocessor, a computer, an automatic control or any suitable electronic command and control device.

The control member 35 is connected to the set of valves 13, 14, 15, 16 to command the opening/closing thereof and to the compressor or compressors 7 to command the starting, stopping and operation thereof (for example the speed or power thereof).

In the conventional way, the filling device 1 preferably also comprises a cooling member for cooling the gas transferred to the tank 12 that is to be filled (for the sake of simplicity, this is not depicted here). This cooling member (for example a heat exchanger cooled by a cold source) is generally positioned downstream of the compressor 7.

The control member 35 is configured (for example programmed) to command the valves 13, 14, 15, 16 and/or the compressor 7 to ensure transfer of gas into the tank 12 from at least one source 4, 5, 6 and/or from at least one buffer storage device 8, 9, 10 by pressure equalizing and/or via the compressor 7.

In particular, the control member 35 is configured to ensure the transfer of gas into the tank 12 using a predefined protocol which may be dependent on the conditions or on the condition of the device 1. This protocol may predict the quantity and the speed for the filling of the tank 12 with gas. Likewise, this protocol may define the provenance of the gas transferred into the tank (source(s), buffer storage device(s), whether or not the compressor is used, compressor speed, etc.).

In order to do that, the device 1 preferably comprises a set of pressure sensors 24, 25, 26, 28, 29, 30 in the circuit 2, measuring the pressure in at least some of the sources 4, 5, 6 and/or buffer storage devices 8, 9, 10.

Likewise, a set of temperature sensors 33 may be provided.

The control member 35 comprises a member 27 for receiving or generating a signal indicative of the demand for filling from between at least two distinct levels of demand for filling: a relatively high demand and a relatively low demand.

In addition, the control member 35 is configured to transfer gas into the tank 12 using at least a first mode of transfer using, as a matter of priority (or first) the source that is at the highest pressure, and a second mode of transfer using (as a matter of priority, or first) a source at a pressure lower than this highest pressure.

The control member 35 is configured to fill the at least one tank 12 using the first mode of transfer in response to the receipt or generation of a signal indicative of a relatively high demand for filling, and to fill the at least one tank 12 using the second mode of transfer in response to the receipt or generation of a signal indicative of a relatively low demand for filling.

What that means to say is that the filling device 1 intelligently chooses the gas source from among several sources, either in order to increase the poor filling performance of the device 1 for a predefined period or during a situation of predefined duration, or in order to use the sources of gas at lower pressure and/or to empty these slowly to their minimum pressure according to predefined operating parameters (lower performance).

The operating parameters may include at least one of the following:
  the various pressure levels within the sources 4, 5, 6,
  the various pressure levels within the buffer storage devices 8, 9, 10,
  the pressure of the tank that is to be filled,
  the temperature of all or some of the tanks (sources, buffer storage devices, tank to be filled),
  the date
  the time,
  the number of vehicles/tanks 12 to be filled that are waiting at or heading toward the filling device 1,
  an external command (for example other than from a customer/user, for example a supervision device, an operator, artificial intelligence, a manual command) to anticipate future filling loads and/or other constraints (for example logistical constraints regarding the sources, such as unavailabilities, industrial action, public holidays, lengthy periods of replenishment/distribution center being unable to operate, etc.).

Thus, the device 1 can be configured to use the source 4, 5, 6 with the highest pressure during peaks in consumption and/or in response to an external order and/or as a function of the date and of the time and/or of the number of awaiting or approaching tanks 12 that are to be filled.

For example, by keeping regular records on one or more filling devices 1, it is possible to predict (to predefine) the moments of daily peaks in consumption for each of the filling devices 1.

For example, using a statistical processing of these records fora filling device, typical daily profiles can be created and implemented in the control device 35 and/or in its remote monitoring/control system.

In addition, by iterative consolidation from one day to the next, or from one week to the next, or from one year to the next, these daily load profiles will become increasingly accurate and indicative of a trend (for example profiles each Monday or each first Saturday of the summer holidays). These profiles may be distinguished according to at least one of the following parameters (which are not exhaustive and can be combined):
  the day of the week. For example, the typical daily profile for a Tuesday (with pronounced peak loadings between 0700 h and 1000 h and then between 1600 h and 2000 h) may differ from a load profile for a Wednesday (which is smoother throughout the day, namely having peak loadings that are less pronounced and more spread over time),
  public holidays or the day/night before public holidays. Public holidays are days that are prime candidates for long journeys. Thus, a significant load will be imposed on the filling devices 1 throughout the day. Thus, the use profiles for a device will indicate a higher load during the course of the morning than during a normal day and even than during a weekend day,
  the weather forecast (for example, a rainy day may represent less of a load than a sunny day),
  according to the region or the location of the filling device 1.

Thus, using these typical daily profiles, the program implemented by the control member 35 and that operates the filling device 1 and/or supervises same, may anticipate the moments of significant load and thus choose to increase its performance (first mode of transfer) for a certain fixed and parameterized length of time (for example 1 hour) before the increase in load that is the rate of use thereof (as assumed from the typical profiles). For example, one hour before the time of the peak in load, the control device 35 automatically changes its source of pressure for the transfer of gas, selecting the source 4, 5, 6 that is at the highest pressure. This can be done by operating the appropriate valves. This switches the filling device 1 over into a mode of optimum/maximum performance in order to operate at full capacity. The filling device 1 will be able to be replenished more rapidly and will be 100% available when users arrive in large numbers.

Thus, by virtue of this particular feature, the filling device 1, once replenished to its maximum (buffer storage devices full and/or degree of coldness of the cooling device achieved) and with optimum performance, can fill the maximum number of vehicles/tanks 12, thereby reducing the waiting time between fillings. Specifically, the waiting time between fillings generally corresponds to the time taken for the station 1 to internally replenish itself and to re-pressurize the buffer storage devices 8, 9, 10 used in the previous filling operation.

This also makes it possible to maximize the customer filling rates thanks to the load profiles and thus thanks to a preestablished load plan or, more simply, according to a preestablished timing.

Conversely, thanks to these profiles indicating load/demand as a function of typical day (or week or day of the year), the filling device 1 is able automatically to determine when the source with the highest pressure should not be used, in order to connect itself to a source at a lower pressure. Thus, the operating capacity of the filling device 1 is reduced. The benefit/advantage of this is that it reduces the throughput of the compressor.

This makes it possible to reduce the electrical power consumption of the compressor 7. Specifically, for the same source pressure supplied to the inlet of the compressor, if the throughput of the compressor 7 is halved (by reducing the speed of the motor of the compressor 7 for example), its electrical power consumption (for example per hour) is also halved. Thus, a compressor that consumes 100 kW per hour at full power has its power consumption reduced to 50 kW per hour when its throughput is halved. This makes it possible to smooth out spikes in electrical power consumption.

Reducing the compression speed of the compressor 7 also makes it possible to reduce undesirable heating. Specifically, as the gas heats up in the cylinder during the compression phase (in the case of a piston compressor), the exchange of heat with the compressor 7 cooling system is more effective because the heat-exchange time is longer. This makes it possible to reduce the extent to which the wearing parts of the compressor 7 (such as the sealing rings, the diaphragms, the intake valves or the delivery valves) heat up.

This also reduces the energy demand on the cold unit which cools these hot parts (exchangers, cylinder, etc.). The solution described makes it possible to reduce maintenance costs (because the wearing components do not heat up as much and therefore do not wear as quickly) by around 20%, and also to reduce the cost of electrical power consumption demanded by the cooling system, by around 20%.

By reducing the compression speed of the compressor 7 the compressor 7 is also allowed to operate in a steady-state for longer. This notably makes it possible to reduce the number of stops and starts for the same number of successive filling operations or during the course of a filling operation. Specifically, if the compressor 7 operates at full capacity and a vehicle arrives every 5 minutes and the compressor 7 takes for example 3 minutes to re-pressurize the buffer storage devices 8, 9, 10 in order to prepare for the next filling operation, then the compressor 7 will stop and restart between each of the fillings of a tank that is to be filled. On the other hand, if the same compressor 7, for example, during a less-busy period, operates at 50% of its performance, it will not stop between each of the fillings of a tank 12. This then further limits the electrical power consumption demands which spike on each start.

By reducing the number of stops and starts of the compressor 7, this also reduces the phases during which the compressor 7 cools down. Thus, the wearing components (such as the sealing rings, the diaphragms, the valves, etc.) will experience fewer, if any, significant thermal variations. These wearing components are generally rated for use at stable operating conditions such as the process pressure (500 bar or 1000 bar) and the operating temperature (between 100 and 250 degrees Celsius for example). During a starting phase, the mechanical shocks and the levels of stress and of expansion are different. All of these parameters greatly deteriorate these components during starting phases. Thus, reducing the number of starts/stops using the solution described makes it possible to reduce the level of wear and therefore reduce the human intervention required for carrying out maintenance on and changing the components. Financial savings on the operation of the stations are therefore made.

The fact of commanding a reduction in the performance of the filling device 1 (second mode of transfer of gas during a relatively low demand for filling) means that the compressor 7 can be used in other configurations. Specifically, the throughput of a positive-displacement compressor 7 is proportional to its intake pressure. Consider for example a compressor that has a throughput of 100 Nm3/h when its source pressure is 200 bar. If its intake pressure drops to 50 bar, its throughput will drop approximately as far as approximately 25 Nm3/h. Therefore, in order for a filling device 1 to exhibit its maximum performance, the source needs to be at the maximum pressure. That means that in the middle of the day or during peaks in load, the control solution (member 35) will command the use of the highest source pressure.

Conversely, when the demand on the device is not very high (the demand for filling is relatively low), the device may allow itself to use sources 4, 5, 6 at a lower pressure.

Thus, in the middle of the day (when the demand for filling is relatively high), it may be inadvisable to use a source 4, 5, 6 at a lower pressure in case the demand for filling cannot be met. That means that maximum use can be made of a source 4, 5, 6 down to its lowest pressure/capacity. Thus, the operating costs are reduced because these include the cost of the source 4, 5, 6, the cost of transport and the cost of the unused quantity of gas. Specifically, if, for example, a source 4, 5, 6 (initially at 200 bar) returns to the replenishment/distribution center with an internal pressure of 50 bar rather than 30 bar, that means that approximately 10% of the usable capacity has not been used. Therefore, 10% of the molecule purchase price is unused and this is passed on and reflected in the operating costs as lost earnings.

Likewise, using this same example, regarding the cost of transporting the gas, for 100 kg transported at a transport cost of 100€, if a source returns with a pressure of 50 bar, then this is reflected in a cost of transport which is now 100€ for 75 kg (1.33€ per kg for example). If the source returns with a pressure of 30 bar, then this is reflected in a cost of transport that is now 100€ for 85 kg (1.177 €/kg).

This demonstrates the economic benefit of using the source pressure that is as low as possible during periods of low demand for filling (in order to optimize in terms of the costs of transport and the costs of quantities paid for but not used). The invention thus makes it possible to empty these sources 4, 5, 6 (for example "trailers" or portions of trailers or "bundles") as comprehensively as possible, not during the daytime or during peak usage, but in a way that is intelligent (smart) when the filling device 1 is not being used (for example at night, during predefined timeslots or during absences of customer demand which are anticipated using the above-mentioned load profiles).

Thus, according to one advantageous particular feature, the source or sources at the highest pressure are used as a matter of priority during (or just before) peaks in consumption or under external command as a function of the number of cars waiting, for example.

The filling device 1 may comprise a system 27 for detecting the number of cars present in or arriving at the device 1. This system may comprise for example at least one of the following: a camera, a pass-by sensor, an identification system, a vehicle(s) geolocation system, an entry-detection system (using laser or pressure or the like, etc.).

As a preference, this system makes it possible to identify a significant demand for filling, even if this peak was not predicted. The filling device 1 (member 15 for example), thus receives or generates a signal indicating that the demand for filling has become relatively high (and conversely and respectively that the demand for filling is relatively low).

The device 1 therefore switches to the appropriate mode of transfer (first or respectively second mode of transfer): to use the source 4, 5, 6 of gas at the highest (or respectively the lowest) pressure.

Advantageously, the device may comprise a system 31 for detecting the number of cars approaching the filling device 1. This system may comprise a geolocation device or an external attendance timeslot reservation system or a system linked to the GPS (satellite-navigation or similar) system of the vehicle heading toward the filling device 1). This system 31 makes it possible to identify a significant customer demand, even if this peak was not predicted. The device 1 thus knows that it needs to switch over to the first mode of transfer (full capacity with use of the source of gas at the highest pressure) or to the second mode of transfer (capacity lower than full capacity using a source of gas at a pressure lower than the most highly pressurized gas source).

The solution may also, where appropriate, make it possible to use the sources 4, 5, 6 at a relatively lower pressure in order to optimize and schedule the rotations and deliveries of gas sources or the source changeover (empty source to full source).

The filling device 1 may therefore make it possible to reduce performance in an intelligent (smart) manner at the opportune moment (second mode of transfer during a relatively low demand for filling) or to increase performance during a peak in user demand (first mode of transfer during a relatively high demand for filling).

In addition, the device 1 is also able to anticipate customer demand and thus prepare for its future filling/replenishment.

Thus, the device can use this demand-for-filling information to schedule the optimum moments at which to change over the sources 4, 5, 6.

As a preference, the sources 4, 5, 6 are replaced or filled when they are at the lowest possible pressure and when the filling/distribution centers are available. The filling device 1 may also anticipate public holidays or Sundays (when traffic is limited or even forbidden in certain regions) by automatically ordering full sources 4, 5, 6 in advance.

By emptying the sources 4, 5, 6 during the night (in order to fill the buffer storage devices 8, 9, 10 for example), the filling device 1 can calculate what the pressure of the sources 4, 5, 6 will be in the morning or after a predefined length of time. The filling device 1 (control member 35 for example) may for example send out a signal to place an order for sources 4, 5, 6 the following morning or at an optimum moment (before an expected peak in charge or during a slack period defined by the charge profiles mentioned hereinabove).

This can be anticipated several days in advance thanks to the daily profiles, and by combining the optimizing of performance with the scheduling of the deliveries, this placing of an order can be anticipated and scheduled. This then avoids the need to place urgent orders for gas sources 4, 5, 6, and avoids being faced with supplier unavailability.

In the example of FIG. 1 described hereinabove, the filling device 1 may be a service station. Of course the invention is not restricted to this embodiment example. Thus, all or some of the above features may be employed directly on one or more trailers or tube trailers transporting several containers of pressurized gas. The trailer may thus comprise several compartments (several containers or several sets of containers of pressurized gas) and a suitable set of valves (notably pneumatic valves). In that case, the various sources consist of the various compartments. Controlled operation of the valves allows one compartment or another to be used by way of source. Thus the transfer of gas by the "cascade" effect is performed not between different trailers (different sources as illustrated in FIG. 1) but between the different sources which are distinct parts of the one same trailer.

The command to open/close the valves may be under the control of a station and/or electronic logic on the trailer and/or of a remote control member.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for filling a tank or tanks with pressurized hydrogen gas, comprising: a circuit that comprises a plurality of upstream ends which are respectively connected to distinct sources of pressurized gas, at least one compressor, at least one buffer storage device, a set of operated valves and at least one downstream end intended to be connected to the tank or tanks to be filled; an electronic storage and processing control member connected to the operated set of valves and to the compressor(s), the control member being configured to command the set of operated valves and/or the compressor in order to ensure the transfer of gas into the tank from at least one source and/or from at least one buffer storage device by equalizing pressures and/or using the compressor; and a set of sensors for measuring the pressure within the sources and the buffer storage devices, wherein:
   the control member comprises a member for receiving or generating a signal representative of the demand for filling from among at least two distinct filling-demand levels, including a relatively high demand and a relatively low demand;
   the control member is configured to ensure that gas is transferred into the tank using at least a first mode of transfer employing the source at the highest pressure and a second mode of transfer employing a source at a pressure lower than the highest pressure;
   the control member is configured to fill the at least one tank using the first mode of transfer in response to the receipt or generation of a signal indicative of a relatively high demand for filling, and to fill the at least one tank using the second mode of transfer in response to the receipt or generation of a signal indicative of a relatively low demand for filling;
   the compressor is an electrical compressor or is of a type of compressor that involves rotational or translational movement of a compression element at a determined speed; and
   in the second mode of transfer, either the electrical power of the compressor is between 80% and 25% of the electrical power of the compressor in the first mode or the speed of the compression element of the compressor is between 80% and 25% of the speed of the compression element in the first mode of transfer.

2. The device of claim 1, wherein the member receiving or generating a signal indicative of the demand for filling comprises an electronic agenda and an electronic clock, the control member storing a predefined calendar defining periods of relatively high or relatively low demand according to the day and time which are defined by the agenda and the clock.

3. The device of claim 2, wherein the predefined calendar is updated and, where appropriate, modified, according to actual filling-demand data regarding quantity and dates and times, which is to say that the calendar is, where appropriate, modified iteratively and predictively as a function of logged past data.

4. The device of claim 2, wherein the predefined calendar is updated as a function of external data including: meteorological data (sunny/rainy), atmospheric temperature.

5. The device of claim 1, wherein the member receiving or generating a signal indicative of the demand for filling comprises a detector detecting a vehicle in a zone of the device or in an approach zone of the device, the control member being configured to define a relatively high or relatively low demand according to whether the number of vehicles detected in the zone of the device and/or approaching the device is above or below a predefined threshold number.

6. The device of claim 1, wherein the member receiving or generating a signal indicative of the demand for filling comprises a wireless or wired receiver configured to receive a signal to switch the mode of transfer of gas to the first mode of transfer or to the second mode of transfer.

7. The device of claim 1, wherein the first mode of transfer, the transfer of gas employs one or more sources of gas at the highest pressure comprised between 400 and 800 bar, whilst in the second mode of transfer employs one or more sources of gas at a pressure lower than this highest pressure and comprised between 50 and 400 bar.

8. The device of claim 1, wherein in the second mode of transfer, the successive fillings of several tanks require a number of stops and restarts of the compressor which is lower in comparison with the number of stops and restarts needed to fill the same number of tanks in the first mode of transfer.

9. The device of claim 2, wherein each source comprises at least one of: a tank of pressurized gas, all or part of a set of tanks of pressurized gas on trailers, a tank of liquefied gas combined with a vaporizer, a pressurized-gas network.

10. The device of claim 1, wherein in the second mode of transfer, either the electrical power of the compressor is between 30 and 60% of the electrical power of the compressor in the first mode or the speed of the compression element of the compressor is between 80% and 25% of the speed of the compression element in the first mode of transfer.

11. The device of claim 1, wherein in the second mode of transfer, either the electrical power of the compressor is between 80% and 25% of the electrical power of the compressor in the first mode or the speed of the compression element of the compressor is between 30 and 60% of the speed of the compression element in the first mode of transfer.

12. The device of claim 1, wherein in the second mode of transfer, either the electrical power of the compressor is between 30 and 60% of the electrical power of the compressor in the first mode or the speed of the compression element of the compressor is between 30 and 60% of the speed of the compression element in the first mode of transfer.

13. A method for filling a tank or tanks with pressurized hydrogen gas using the filling device of claim 1, the method comprising a step of filling at least one tank according to the first mode of transfer in response to the receipt or generation of a signal indicating a relatively high demand for filling, or a step of filling at least one tank according to the second mode of transfer in response to the receipt or generation of a signal indicating a relatively low demand for filling, the transfer of gas into the tank using the first mode of transfer employing the source at the highest pressure, the transfer of gas into the tank using the second mode of transfer employing a source of gas at a pressure lower than this highest pressure.

14. The filling method of claim 13, wherein it comprises a step of generating or receiving a signal indicative of a relatively high demand for filling in anticipation of said relatively high demand for filling.

15. The filling method of claim 13, wherein it comprises, during or after or before the filling of a tank, a step of filling at least part of the buffer storage devices with gas from at least one source and possibly using the compressor.

16. The filling method of claim 15, wherein the filling of at least part of the buffer storage devices is performed using the source of gas at the highest pressure during a period of relatively high demand for filling.

17. The filling method of claim 15, wherein the filling of at least part of the buffer storage devices is performed from a source at a pressure lower than this highest pressure during a period of relatively low demand for filling.

* * * * *